United States Patent
Hong et al.

(10) Patent No.: US 11,178,642 B2
(45) Date of Patent: Nov. 16, 2021

(54) TRANSMITTING AND RECEIVING METHOD AND APPARATUS FOR COEXISTENCE BETWEEN HETEROGENEOUS SERVICES

(71) Applicant: Samsung Electronics Co., Ltd., Suwon-si (KR)

(72) Inventors: Sungnam Hong, Suwon-si (KR); Kyeongyeon Kim, Hwaseong-si (KR); Taeyoung Kim, Seoul (KR); Jiyun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 16/315,935

(22) PCT Filed: Jul. 11, 2017

(86) PCT No.: PCT/KR2017/007389
§ 371 (c)(1),
(2) Date: Jan. 7, 2019

(87) PCT Pub. No.: WO2018/012841
PCT Pub. Date: Jan. 18, 2018

(65) Prior Publication Data
US 2019/0306836 A1     Oct. 3, 2019

(30) Foreign Application Priority Data
Jul. 11, 2016   (KR) .................. 10-2016-0087668

(51) Int. Cl.
*H04W 72/04* (2009.01)
*H04L 1/00* (2006.01)
*H04L 29/08* (2006.01)

(52) U.S. Cl.
CPC ............... *H04W 72/04* (2013.01); *H04L 1/00* (2013.01); *H04L 29/08* (2013.01)

(58) Field of Classification Search
CPC ........ H04W 72/04; H04L 29/08; H04L 27/34; H04L 5/0062; H04L 5/0091; H04L 5/0044
See application file for complete search history.

(56) References Cited

U.S. PATENT DOCUMENTS

| | | |
|---|---|---|
| 2006/0090120 A1 | 4/2006 | Chen |
| 2007/0195907 A1 | 8/2007 | Wang et al. |

(Continued)

FOREIGN PATENT DOCUMENTS

| | | |
|---|---|---|
| KR | 10-2007-0065402 A | 6/2007 |
| KR | 10-2008-0089493 A | 10/2008 |

(Continued)

OTHER PUBLICATIONS

Spreadtrum Communications: "Discussion on numerology and frame structure", 3GPP TSG-RAN WG1#84B R1-162549, Apr. 1, 2016 (Apr. 1, 2016), XP051079608 (Year: 2016).*

(Continued)

*Primary Examiner* — Jackie Zuniga Abad

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present invention is a method for transmitting, by a transmitter, a signal in order to efficiently transmit the signal so that heterogeneous services can coexist, the method comprising the steps of: confirming whether a signal to be transmitted is a first signal or a second signal; if the signal to be transmitted is the first signal, transmitting the first signal to a receiver by applying puncturing in a resource region in which the first signal is transmitted and in a (Continued)

resource region overlapping with the second signal; and if the signal to be transmitted is the second signal, applying a phase rotation to the second signal and transmitting the second signal.

12 Claims, 13 Drawing Sheets

(56) References Cited

U.S. PATENT DOCUMENTS

| | | | |
|---|---|---|---|
| 2012/0329400 | A1 | 12/2012 | Seo et al. |
| 2014/0226607 | A1 | 8/2014 | Holma et al. |
| 2015/0256308 | A1 | 9/2015 | Ma et al. |
| 2015/0280871 | A1 | 10/2015 | Xu et al. |
| 2017/0288936 | A1 | 10/2017 | Park et al. |
| 2019/0165906 | A1* | 5/2019 | Bala .......... H04J 11/00 |
| 2019/0190645 | A1* | 6/2019 | Sano .......... H04W 72/04 |

FOREIGN PATENT DOCUMENTS

| | | | |
|---|---|---|---|
| KR | 10-2013-0038804 A | 4/2013 |
| KR | 10-2016-0074076 A | 6/2016 |

OTHER PUBLICATIONS

ISA/KR, International Search Report and Written Opinion of the International Searching Authority for International Application No. PCT/KR2017/007389, dated Oct. 12, 2017, 13 pages.

* cited by examiner

TRANSMITTING AND RECEIVING METHOD AND APPARATUS FOR COEXISTENCE BETWEEN HETEROGENEOUS SERVICES

CROSS-REFERENCE TO RELATED APPLICATIONS

This application is a 371 National Stage of International Application No. PCT/KR2017/007389 filed on Jul. 11, 2017, which claims priority to Korean Patent Application No. 10-2016-0087668 filed on Jul. 11, 2016, the disclosures of which are herein incorporated by reference in their entirety.

BACKGROUND

1. Field

The disclosure relates to a transceiving method and a transceiving apparatus for enabling efficient coexistence of heterogeneous services, and more particularly, proposes a technology for blindly detecting information on resource allocation and transmission signals for each service in overlapping transmissions for heterogeneous services.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

A 5G communication system may provide various services, in which heterogeneous services may coexist based on scheduling. Here, a method and an apparatus for efficiently transmitting and receiving heterogeneous services are needed.

In accordance with an aspect of the disclosure, there is provided a method for transmitting a signal by a transmitter, the method including: identifying whether a signal to be transmitted is a first signal or a second signal; and transmitting the first signal to a receiver by applying puncturing to a resource region where a resource region for transmitting the first signal overlaps with a resource region for transmitting the second signal if the signal to be transmitted is the first signal, or transmitting the second signal by applying a phase shift to the second signal if the signal to be transmitted is the second signal.

Further, there is provided a method for receiving a first signal by a receiver for the first signal, the method including: receiving the first signal; detecting a resource region where the first signal is punctured; estimating a phase shift value applied to a second signal based on the second signal on the punctured resource region; and decoding the first signal based on the estimated phase shift value.

Further, there is provided a method for receiving a second signal by a receiver for the second signal, the method including: receiving the second signal; estimating a phase shift value applied to the second signal on a particular resource region; identifying that a first signal is punctured in the particular resource region based on the phase shift value; and decoding the second signal based on the first signal.

Further, there is provided a transmitter for transmitting a signal, the transmitter including: a transceiver configured to transmit and receive a signal; and a controller configured to: identify whether a signal to be transmitted is a first signal or a second signal; and transmit the first signal to a receiver by applying puncturing to a resource region where a resource region for transmitting the first signal overlaps with a resource region for transmitting the second signal if the signal to be transmitted is the first signal, or transmit the second signal by applying a phase shift to the second signal if the signal to be transmitted is the second signal.

Further, there is provided a receiver for receiving a first signal, the receiver including: a transceiver configured to transmit and receive a signal; and a controller configured to perform control to: receive the first signal; detect a resource region where the first signal is punctured; estimate a phase shift value applied to a second signal based on the second signal on the punctured resource region; and decode the first signal based on the estimated phase shift value.

Further, there is provided a receiver for receiving a second signal, the receiver including: a transceiver configured to transmit and receive a signal; and a controller configured to perform control to: receive the second signal; estimate a phase shift value applied to the second signal on a particular resource region; identify that a first signal is punctured in the particular resource region based on the phase shift value; and decode the second signal based on the first signal.

According to a method for transmitting and receiving a signal in accordance with an embodiment of the disclosure, it is possible to efficiently transmit and receive a signal in the coexistence of heterogeneous services.

DETAILED DESCRIPTION

Figure 1:
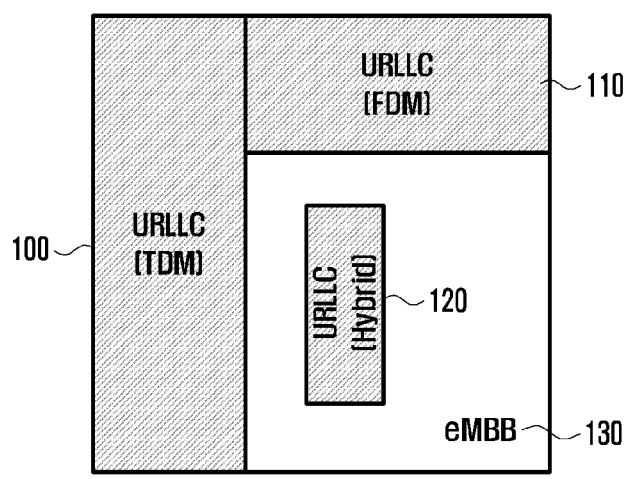
FIG. 1 illustrates a case where a URLLC service and an eMBB service coexist on resources.

Hereinafter, embodiments of the present disclosure will be described in detail in conjunction with the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be made based on the contents throughout the specification.

Further, the gist of the disclosure may be applied even to other communication systems having a similar technical background and a similar channel form with a few modifications without significantly departing from the scope of the disclosure. This applicability may be determined by those skilled in the art in the technical field of the disclosure.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

A fifth-generation (5G) communication system considers supporting various services, compared to an existing fourth-generation (4G) communication system. For example, representative services include enhanced mobile broadband (eMBB), ultra-reliable and low-latency communication (URLLC), massive machine-type communication (mMTC), and evolved multimedia broadcast/multicast service (eM-BMS), among which URLLC is a service newly considered in the 5G communication system, rather than in the existing 4G communication system, and is required to meet the requirements of ultra-high reliability (packet error rate of 10-5) and low latency (0.5 msec), compared to other services.

Also, scenarios in which various services coexist based on scheduling are considered. FIG. 1 illustrates a case where a URLLC service and an eMBB service coexist on resources. Referring to FIG. 1, a resource 100 for a URLLC service coexists with a resource 130 for an eMBB service in a time-division multiplexing (TDM) scheme, and a resource 110 for another URLLC service coexists with the resource 130 for the eMBB service in a frequency-division multiplexing (FDM) scheme. Further, a resource 120 for an URLLC service included in the resource 130 for the eMBB service may exist through a combination of TDM and FDM.

In order to satisfy the strict requirements described above, the URLLC service needs to apply a transmission time interval (TTI) shorter than that of the eMBB service, and various operating methods using a TTI are considered. For example, a scenario may be considered in which, in a downlink network environment, the eMBB service (which may be interchangeable with the eMBB) is scheduled and operates based on an eMBB TTI and the URLLC service (which may be interchangeable with the URLLC) is scheduled and operates based on a TTI shorter than the eMBB TTI.

Figure 2:
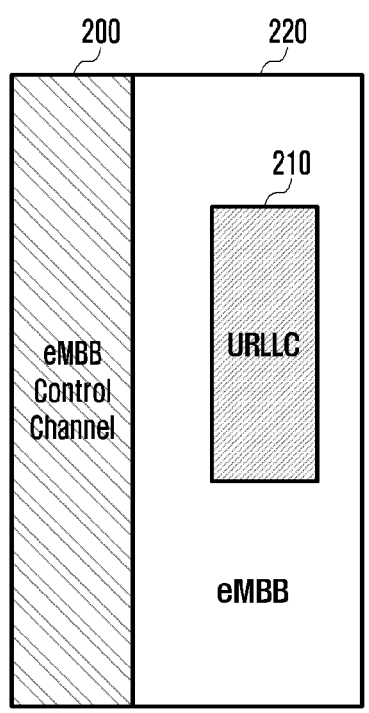
FIG. 2 illustrates a case where an eMBB service and a URLLC service coexist.

FIG. 2 illustrates a case where an eMBB service and a URLLC service coexist. Referring to FIG. 2, a control signal of an eMBB service is first transmitted 200 in a TDM scheme, and a resource 210 for a URLLC service may be allocated among resources 220 for transmitting data of the eMBB service. Here, when a base station needs to transmit a URLLC service packet while transmitting an eMBB service packet, the base station may allocate the resource for the URLLC service packet instead of the eMBB service packet, which is for the eMBB service as if all data symbols to be transmitted via the resource are punctured.

Further, in the case of applying this operating method, since the URLLC service can be scheduled after the control signal of the eMBB service is transmitted, it is impossible to transmit information on the presence of the URLLC service and scheduling information on the URLLC service via the control signal of the eMBB service. Therefore, an eMBB service-receiving terminal cannot receive the scheduling information on the URLLC service via the control signal.

Figure 3:
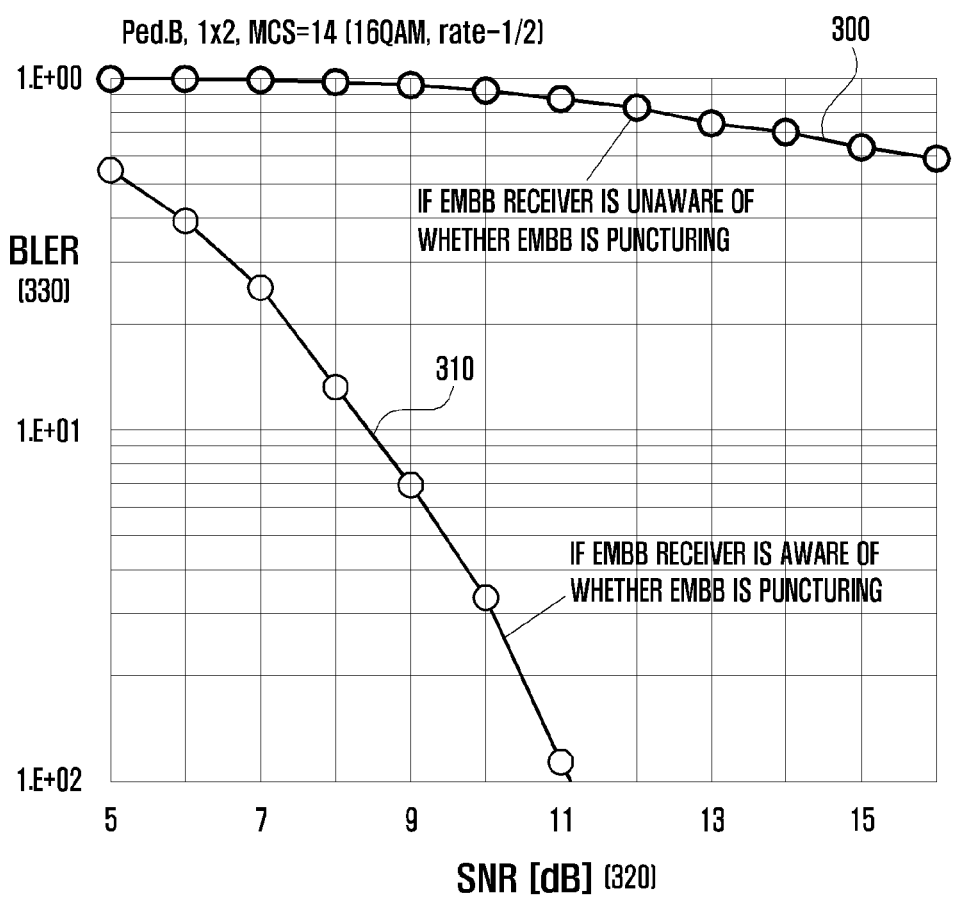
FIG. 3 compares the performance where an eMBB service receiver is aware of eMBB puncturing and the performance where the eMBB service receiver is unaware of eMBB puncturing.

However, if there is a URLLC in a resource region allocated for the eMBB service-receiving terminal but the eMBB service-receiving terminal does not know the presence of the URLLC, performance in receiving the eMBB service may seriously deteriorate. FIG. 3 compares the performance where an eMBB service receiver is aware of eMBB puncturing and the performance where the eMBB service receiver is unaware of eMBB puncturing. Referring to FIG. 3, in the case 310 where the receiver is aware of eMBB puncturing, compared to the case 300 where the receiver is unaware of eMBB puncturing, the block error rate (BLER) 330 is significantly reduced as the signal-to-noise ratio (SNR) 320 increases. Further, FIG. 3 shows that even a considerably small URLLC transmission signal may cause very large performance deterioration in the eMBB service. Actually, in the experimental environment of FIG. 3, the URLLC transmission signal is only about 10% or less of an eMBB transmission signal.

The reason for this performance deterioration is that the eMBB service-receiving terminal considers the URLLC signal as a signal for the terminal and attempts to decode a channel using the URLLC signal. Accordingly, if the eMBB service-receiving terminal accurately knows the location of a resource used for the URLLC service, the eMBB reception performance is significantly improved, which is shown in FIG. 3.

For this reason, the eMBB service-receiving terminal needs to know whether there is a resource used for a URLLC in resources allocated to the terminal, but there is a case where the terminal cannot receive relevant scheduling information depending on the operating technique. Therefore, it is necessary for the eMBB service-receiving terminal to blindly detect the information, and a URLLC transmission signal needs to have a structure that is blindly detectable.

As another example of coexistence of heterogeneous services, a scenario may be considered in which an eMBB service and a URLLC service are scheduled and operate based on an eMBB TTI in a downlink network environment. In this case, since the base station schedules the URLLC service while scheduling the eMBB service, the base station can report, to an eMBB receiving terminal, whether there is a URLLC resource among resources allocated to the terminal through control information on a control channel. However, since the control information is information that needs to be reported in small resource blocks (which can be construed as small units of schedulable resources), the amount of the information is likely to be very large. Therefore, using a method of reporting the information to the eMBB service-receiving terminal through the control channel may cause a significant increase in overhead of the control channel. Therefore, the eMBB service-receiving terminal needs to blindly detect the information, and a URLLC transmission signal needs to have a structure that is blindly detectable by the eMBB service-receiving terminal.

Figure 4:
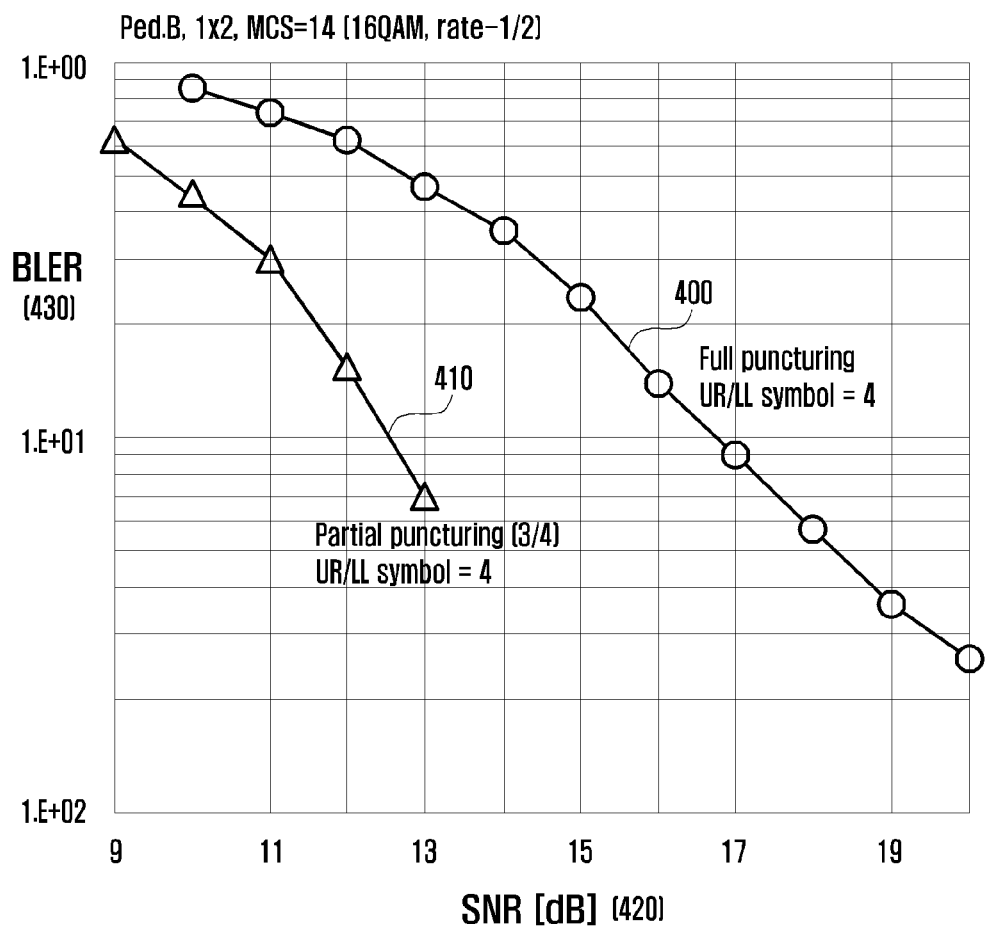
FIG. 4 illustrates the performance of an eMBB service where a URLLC resource is allocated through full puncturing or partial puncturing of the eMBB service.

In addition, when it is necessary to support a URLLC service while an e-MBB service occupies resources in a downlink network environment, the base station may apply a method of completely emptying some of the resources allocated to the e-MBB service for the URLLC service. This method is categorized as an orthogonal multiple access scheme, and this multiple access scheme does not cause interference between the eMBB service and the URLLC service. However, if the multiple access scheme is applied even in the case of many URLLC transmission packets, the resources allocated for the eMBB service are excessively emptied, and thus the eMBB service may have severe performance deterioration. FIG. 4 illustrates the performance of an eMBB service where a URLLC resource is allocated through full puncturing or partial puncturing of the eMBB service. Referring to FIG. 4, in the case 410 of partial puncturing, compared to the case 400 of full puncturing, the BLER 430 is significantly reduced as the SNR 420 increases.

In order to mitigate this performance deterioration due to puncturing, the base station may transmit transmission symbols for the eMBB service and transmission symbols for the URLLC service to partly overlap (partial puncturing). Using this transmission method may considerably reduce the serious performance deterioration of the eMBB service, which is shown in FIG. 4.

Figure 5:
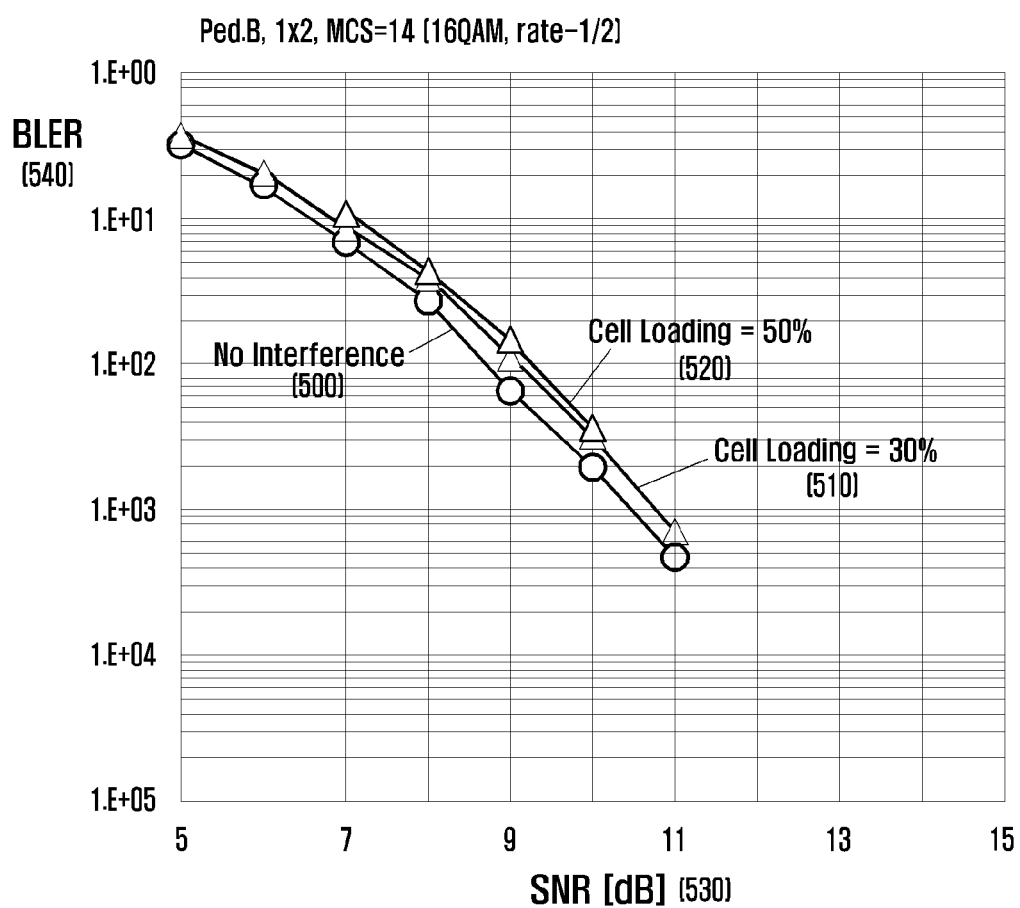
FIG. 5 illustrates reception performance where a URLLC service-receiving terminal applies an interference suppression technique.

In addition, a URLLC service-receiving terminal may overcome the impact of interference due to the eMBB service by applying an interference suppression reception technique as shown in FIG. 5. FIG. 5 illustrates reception performance where a URLLC service-receiving terminal applies an interference suppression technique. Referring to FIG. 5, if the interference suppression technique is applied, the BLER 540 according to the SNR 530 is not significantly different in 50% cell loading 520 and in 30% cell loading 510 from that even in the case of no interference 500. Therefore, if the interference suppression technique is applied, the URLLC service-receiving terminal can be provided with a URLLC service with sufficient performance even though the service is provided through partial puncturing of eMBB service resources instead of full puncturing of the eMBB service resources.

However, in FIG. 4, in order to improve performance, the eMBB service terminal needs to know a region for transmitting a URLLC service packet among the resources allocated to the eMBB service terminal and needs to know a modulation scheme for the URLCC packet. The eMBB receiving terminal needs to estimate a punctured portion of symbols thereof using this information and needs to perform demodulation reflecting the portion. In addition, the eMBB service-receiving terminal may apply an appropriate interference suppression reception technique (for example, an interference aware detection (IAD) scheme or a symbol-level interference cancellation (SLIC) technique) to a reception signal affected by an interfering URLLC service transmission symbol, thereby improving performance. However, the above pieces of information may not be provided to the receiving terminal on an eMBB control channel depending on operation scenarios. Further, although the foregoing information may be provided to the eMBB service-receiving terminal on the control channel depending on operation methods, the information is information that needs to be reported in small resource blocks, and thus the amount of the information is likely to be very large. Therefore, using a method of reporting the information to the eMBB service-receiving terminal through the control channel may cause a significant increase in overhead of the control channel.

Further, in FIG. 5, in order to overcome the impact of an interference signal due to the eMBB service, the URLLC service-receiving terminal needs to know a region, where a collision with an eMBB service packet occurs, in a resource region allocated to the URLLC service-receiving terminal and needs to know a modulation scheme for the eMBB service packet. The URLLC service-receiving terminal needs to estimate a portion of a received signal thereof, which is affected by the interference signal, using this information and needs to apply the interference suppression reception technique to the portion. Although the above pieces of information may be provided to the URLLC receiving terminal on a control channel depending on operation methods, the information is information that needs to be reported in small resource blocks, and thus the amount of the information is likely to be very large. Therefore, using a method of reporting the information to the URLLC service-receiving terminal through the control channel may cause a significant increase in overhead of the control channel.

Therefore, the eMBB service-receiving terminal and the URLLC service-receiving terminal need to blindly detect the information, and an eMBB or URLLC transmission signal need to have a structure that is blindly detectable.

The disclosure describes a transmission scheme for easily estimating pieces of information on a region where a collision occurs between service packets of heterogeneous services and on an interference signal in the coexistence of heterogeneous services. Also, the disclosure proposes a method in which a UE receiving each coexisting service blindly estimates pieces of information on a region where a collision occurs between service packets and on an interference signal using the transmission scheme. In addition, the disclosure proposes a reception technique for improving reception performance using pieces of information estimated by each receiving terminal.

The disclosure proposes a transmission method for a new URLLC service. In particular, the disclosure proposes a method for transmitting a symbol using a modification of a conventional modulation scheme when an eMBB service and a URLLC service overlap.

In transmitting a signal for a URLLC service, if quadrature amplitude modulation (QAM) according to a conventional technology is applied to a symbol of the signal, it may be impossible to perform blind detection according to the disclosure. When a URLLC resource is allocated by full-puncturing of eMBB resources and a URLLC service signal is transmitted, if the eMBB and the URLLC apply QAM with the same modulation order to each transmission symbol, a receiver may not distinguish whether the symbol belongs to the eMBB or the URLLC. That is, since an eMBB signal and a URLLC signal have the same fading channel effect in a downlink, each symbol can be distinguished only when the eMBB service and the URLLC service apply different modulation orders.

In the case where the eMBB service and the URLLC service apply the same modulation order to the transmission symbols, it is difficult for a receiving terminal to distinguish whether the resources are fully punctured. Therefore, an eMBB service-receiving terminal needs information on whether there is a region where the eMBB service overlaps with the URLLC service and information on processing (for example, information on full puncturing or partial puncturing) performed on an eMBB signal in the region. Here, the eMBB service-receiving terminal calculates a generalized log likelihood ratio (LLR) in a region that the eMBB service does not overlap with the URLLC service. If full puncturing is performed, a log likelihood ratio (LLR) in a punctured region is set to 0. If partial puncturing is performed, an interference suppression reception technique for suppressing interference due to the URLLC service is applied in a non-punctured region and LLR is set to 0 in a punctured region.

In addition, a URLLC service terminal needs information on whether there is a region where the URLLC service overlaps with the eMBB service and information on the eMBB service (for example, information on full puncturing or partial puncturing) in the region where the URLLC service overlaps with the eMBB service. Here, the URLLC service-receiving terminal does not apply an interference suppression reception technique to a region where full puncturing of the eMBB resources is performed but applies the interference suppression reception technique to a region where partial puncturing is performed.

Here, the disclosure proposes a method in which general QAM is applied in the transmission of a signal for an eMBB service and cell (interchangeable with user equipment, UE, user device, or terminal)-specific phase-shifted QAM is applied in the transmission of a signal for a URLLC service. Further, a different phase shift value may be applied depending on whether a method of overlapping eMBB and URLLC services is full puncturing or partial puncturing, which is for enabling blind detection, such as URLLC blind detection in eMBB full puncturing, URLLC blind detection in a non-eMBB-overlapping region, and URLLC blind detection in eMBB partial puncturing.

A method in which an eMBB service-receiving terminal estimates URLLC interference information is illustrated below. The eMBB service-receiving terminal first estimates a region where a collision with a URLLC service signal occurs, which may be performed by calculating D and $U_{l,m}$ using a sample of a reception symbol in a punctured resource region among the eMBB resources using a predefined pattern. Equation 1 below illustrates a method for calculating D and $U_{l,m}$.

$$D = \sum_{k=1}^{N_s} \sum_{s \in A} |y_k - H_k s|^2,$$  [Equation 1]

$$U_{l,m} = \sum_{k=1}^{N_s} \sum_{s \in B_{l,m}} |y_k - H_k s|^2,$$

$$l = 1, 2, \ldots \; m = 1, 2, \ldots \; ,$$

Here, l is a candidate modulation order index for URLLC, and m is a candidate phase shift index for URLLC. A denotes a constellation set according to the modulation scheme of an eMBB signal, s denotes a candidate symbol on each constellation, $y_k$ denotes a reception symbol on a kth resource element (RE), and $H_k$ denotes a fading channel coefficient of the kth RE. $N_s$ denotes the number of reception symbol samples in an eMBB-punctured region, and $B_{l,m}$ denotes a constellation set for an mth value among the phase shift candidates in an lth modulation scheme among the URLLC modulation candidates. Here, D may denote the Euclidean distance between a reception symbol and an eMBB symbol candidate, and U may denote the Euclidean distance between a reception symbol and a URLLC symbol candidate.

Here, the eMBB service-receiving terminal estimates whether a collision with a URLLC transmission signal occurs according to Equation 2.

$\min\{D, U_{l,m}\} \neq D$->collision with URLL occurs $\min\{D, U_{l,m}\} = D$->no collision with URLL occurs     [Equation 2]

If a calculated D value is smaller than all U values, since a reception symbol is an eMBB symbol, the eMBB service-receiving terminal may determine that no collision with a URLLC signal occurs. However, if the minimum value among the D value and all the U values is one of the U values, the eMBB service-receiving terminal may determine that a URLLC signal is received.

If a collision with a URLLC transmission signal occurs, the eMBB service-receiving terminal estimates the modulation order of the URLLC signal and a phase shift value applied to the signal according to Equation 3 below.

$\min\{D, U_{l,m}\} \neq D$ and $(\hat{l}, \hat{m}) = \arg\min_{l,m}\{U_{l,m}\}$->URLL
modulation order and phase shift value can be
estimated     [Equation 3]

Subsequently, the eMBB service-receiving terminal estimates power control information applied to the URLLC signal. Power control may be performed when eMBB partial puncturing is applied, and the eMBB service-receiving terminal may estimate the power control information based on the phase shift value applied to the URLLC signal determined by Equation 3. Specifically, the eMBB service-receiving terminal may construct a constellation of candidate power ratios (interchangeable with power weighting factors) using reception symbol samples in a non-eMBB-punctured region using a predefined pattern and may calculate $T_i$ according to Equation 4, thereby estimating a power ratio having the minimum value.

$$T_i = \sum_{k=1}^{N_p} \sum_{s \in Q_i} \sum_{x \in G_i} |y_k - H_k s - H_k x|^2, i = 1, 2, \ldots \quad \text{[Equation 4]}$$

In Equation 4, $N_p$ is the number of samples not eMBB-punctured in an overlapping region, $Q_i$ is a constellation set to which an ith value among the eMBB power weighting factor candidates is applied, and $G_i$ is a constellation set to which an ith value among the URLLC power weighting factor candidates is applied. s and x respectively denote an eMBB candidate symbol and a URLLC candidate symbol according to the respective constellation sets.

A method in which a URLLC service-receiving terminal estimates information on interference by an eMBB signal is illustrated below. The URLLC terminal first estimates a region where a collision with an eMBB signal occurs and an eMBB puncturing method, which may be performed by calculating $U_{l,m}$ using a sample of a reception symbol in an eMBB-punctured region using a predefined pattern. Equation 5 below illustrates a method for calculating $U_{l,m}$.

$$U_{l,m} = \sum_{k=1}^{N_s} \sum_{s \in B_{l,m}} |y_k - H_k s|^2, m = 1, 2, \ldots \quad \text{[Equation 5]}$$

m: URLL candidate phase shift index

The URLLC service-receiving terminal estimates the phase shift value of a URLLC signal according to the condition in Equation 6 below and estimates whether a collision with an eMBB signal occurs and an eMBB puncturing method using the phase shift value.

$\hat{m} = \arg\min_m\{U_{l,m}\}$->URLL modulation order and
phase shift value can be estimated     [Equation 6]

Then, the URLLC service-receiving terminal estimates power control information and a modulation order applied to the eMBB signal. This process may be performed when performing eMBB partial puncturing. The URLLC terminal may construct a constellation of candidate power ratios using reception symbol samples in the eMBB-punctured region using a predefined pattern and may calculate $T_{l,i}$ according to Equation 7, thereby estimating a modulation order applied to the eNBB signal and a power ratio such that $T_{l,i}$ has the minimum value.

$$T_{l,t} = \sum_{k=1}^{N_p} \sum_{s \in Q_{l,i}} \sum_{x \in G} |y_k - H_k s - H_k x|^2, \quad \text{[Equation 7]}$$

$l = 1, 2, \ldots \, i = 1, 2, \ldots$

G: Set of URLL constellation points $Q_{l,i}$: Set of eMBB constellation points according to candidate modulation order and power ratio The disclosure is improved in that, although there is a transmission technique in which a constant phase shift is applied to all QAM symbols, an overlapping signal is transmitted by differently setting a phase shift value for each particular group according to an applied transmission technique and a receiver detects a phase-shifted block (resource region) among the received signals and applies an appropriate reception technique depending on the applied phase shift value.

Table 1 below is an example of a phase shift set applicable to a URLLC transmission signal. This is merely an example, and the content of the disclosure is not limited thereto. A phase shift value may be cell-specific or terminal-specific and may be differently applied to one UE according to an overlapping method (full puncturing or partial puncturing). Further, a phase shift value may be predetermined, some of the predetermined values may be set through an indicator, or a phase shift value may be signaled. Alternatively, as a value among the predetermined values is applied, a receiver may obtain the applied value via blind detection without signaling.

TABLE 1

| | |
|---|---|
| 1 | +30°, 0°, −30° |
| 2 | +45°, +30°, +15°, 0°, −15°, −30°, −45 |
| 3 | −40°, −30°, −20°, −10°, 0°, 10°, 20°, 30°, 40° |

Figure 6:
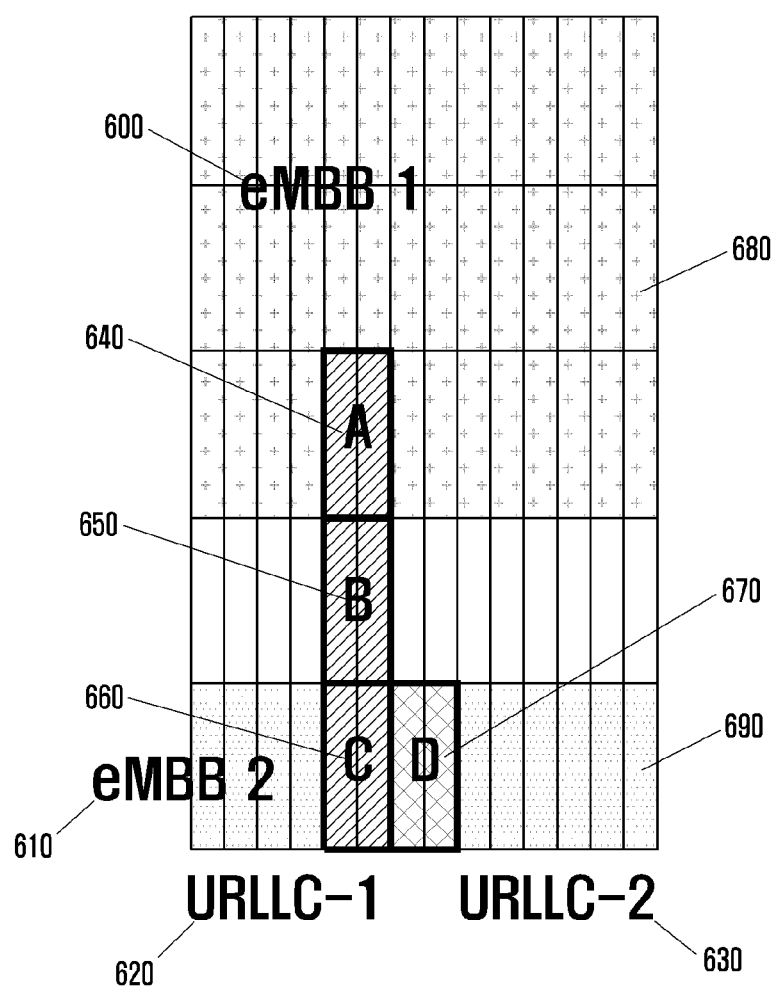
FIG. 6 illustrates an embodiment to which the disclosure is applied.

FIG. 6 illustrates an embodiment to which the disclosure is applied. Referring to FIG. 6, signals for eMBB terminal 1 600, eMBB terminal 2 610, URLLC terminal 1 620, and URLLC terminal 2 630 are transmitted in a resource region, in which eMBB terminal 1 receives a signal in a region 680, eMBB terminal 2 receives a signal in a region 690, URLLC terminal 1 receives a signal in region A 640, region B 650, and region C 660, and URLLC terminal 2 receives a signal in region D 670. Here, it is assumed that the ratio of transmission symbols for eMBB terminal 1 affected by a URLLC service packet is less than a reference value (for example, 10% or less) and the ratio of transmission symbols for eMBB terminal 2 affected by the URLLC service packet is greater than another reference value (for example, 35% or greater).

A transmitter transmitting a signal for eMBB terminal 1 operates as follows. The transmitter transmits QAM symbols generated by performing modulation according to the modulation and coding scheme (MCS) level thereof in the region 680 excluding region A. In region A, since the ratio of URLLC signals affecting the signal is less than the reference value, the transmitter fully punctures the transmission symbols for eMBB terminal 1 and transmits a signal for URLLC terminal 1.

A transmitter transmitting a signal for eMBB terminal 2 operates as follows. The transmitter transmits QAM symbols generated by performing modulation according to the MCS level thereof in the region 690 excluding regions C and D. Since the ratio of URLLC signals affecting the signal is greater than the reference value, the transmitter partially punctures the transmission symbols for eMBB terminal 2 according to a predefined puncturing pattern and transmits signals for URLLC terminal 1 and URLLC terminal 2 in regions C and D. The transmitter applies a predefined power weighting factor (for example, 0.2) to a symbol mapped to a resource element that is not punctured according to the predefined puncturing pattern in regions C and D and then transmits a general QAM symbol according to the MCS level thereof.

A transmitter transmitting a signal for URLLC terminal 1 operates as follows. Since the signal for eMBB terminal 1 is fully punctured in region A, the transmitter applies a 30° phase shift to a QAM symbol of the signal for URLLC terminal 1 transmitted in region A and transmits the signal. In region B, since there is no portion overlapping with resources allocated for the eMBB terminals, the transmitter transmits a general QAM symbol according to the MCS level thereof. That is, a phase shift value is 0°. Since the signal for eMBB terminal 2 is partially punctured in region C, the transmitter applies a −30° phase shift to the QAM symbol of the signal for URLLC terminal 1 transmitted in region C and transmits the signal. Further, the transmitter applies a predefined power weighting factor (for example, 0.8) to a symbol in a resource element where the signal for eMBB terminal 1 is not punctured in region C, applies a −30° phase shift to the QAM symbol, and then transmits the signal.

A transmitter transmitting a signal for URLLC terminal 2 operates as follows. Since the signal for eMBB terminal 2 is partially punctured in region D, the transmitter applies a −30° phase shift to a QAM symbol of URLLC terminal 2 transmitted in region D and transmits the signal. The transmitter applies a predefined power weighting factor (for example, 0.8) to a symbol in a resource element where the signal for eMBB terminal 2 is not punctured in region D, applies a −30° phase shift to the QAM symbol, and then transmits the signal.

Here, receivers of eMBB terminal 1 and eMBB terminal 2 operate as follows. The terminal blindly detects a region where a collision with a URLLC signal occurs in a resource region according to the above-described method. Then, the terminal estimates a phase shift value applied to a QAM symbol in the region where the collision with the URLLC signal occurs and applies an appropriate LLR calculation method accordingly.

Specifically, when the phase of the QAM symbol of the URLLC signal is shifted by 30° in the region where the collision with the URLLC signal occurs, the terminal recognizes that eMBB full puncturing has been performed in the region, sets all LLRs in the region to 0, and performs channel decoding. This method may be applied to region A. When the phase of the QAM symbol of the URLLC signal is shifted by −30° in the region where the collision with the URLLC signal occurs, the terminal recognizes that eMBB partial puncturing has been performed in the region and classifies the region into a punctured resource element and a non-punctured resource element according to a predefined puncturing pattern. The eMBB terminal sets all LLRs for the punctured resource elements to 0.

The eMBB terminal blindly estimates a modulation method (for example, QPSK, 16QAM, 64QAM, or the like) for the colliding URLLC signal using a reception signal on the punctured resource element according to the above-described method. Further, the eMBB terminal applies a predefined power weighting factor to a symbol on the non-punctured resource element and applies interference suppression reception techniques to the URLLC signal, thereby calculating an LLR. Here, the interference suppression reception techniques that can be applied may include an LLR calculation technique using a resource element (RE) group-based Gaussian probability density function (PDF), an RE group-based interference recognition and detection technique, an interference-based symbol level interference cancellation technique, and an LLR calculation technique using a complex generalized Gaussian PDF.

Receivers of URLLC terminal 1 and URLLC terminal 2 operate as follows. The URLLC terminal selects resource elements that are not affected by interference despite the occurrence of a collision with an eMBB signal from allocated resources thereof using a predefined puncturing pattern. The URLLC terminal estimates a phase shift value by which a QAM symbol is multiplied using reception symbols on the selected resource elements. The URLLC terminal detects a region in which the QAM symbol is transmitted via a 0° or 30° phase shift in the resource element region thereof, recognizes that eMBB full puncturing is performed in the region, calculates an LLR by applying an LLR calculation method using a Gaussian PDF, and then performs channel decoding.

Also, the URLLC terminal detects a region in which the QAM symbol is transmitted via a −30° phase shift in the resource element region thereof and recognizes that eMBB partial puncturing is performed in the region. The URLLC terminal selects a resource element that is not affected by interference due to eMBB partial puncturing and calculates an LLR by applying an LLR calculation method using a Gaussian PDF to a symbol on the resource element. In addition, the URLLC terminal blindly estimates a modulation scheme (for example, QPSK, 16QAM, 64QAM, or the like) for the eMBB signal using a symbol on a resource element affected by interference due to eMBB partial puncturing, applies a predefined power weighting factor, and applies an interference suppression reception technique to the eMBB signal, thereby calculating an LLR. Here, interference suppression reception techniques that can be applied may include an LLR calculation technique using an RE group-based Gaussian PDF, an RE group-based interference recognition and detection technique, an RE group-based symbol level interference cancellation technique, and an LLR calculation technique using a complex generalized Gaussian PDF.

This embodiment is merely an example of the disclosure, and the content of the disclosure is not limited by the above embodiment. Also, although eMBB terminal 1, eMBB terminal 2, URLLC terminal 1, URLLC terminal 2, and the signals for the terminals are assumed in the above embodiment, the signals may be repeatedly transmitted to or received from one or more terminals. For example, a signal for eMBB terminal 1 and a signal for eMBB terminal 2 may be transmitted to one terminal. Further, in full puncturing and partial puncturing, different phase shift values may be applied or the same phase shift value may be applied.

Figure 7:
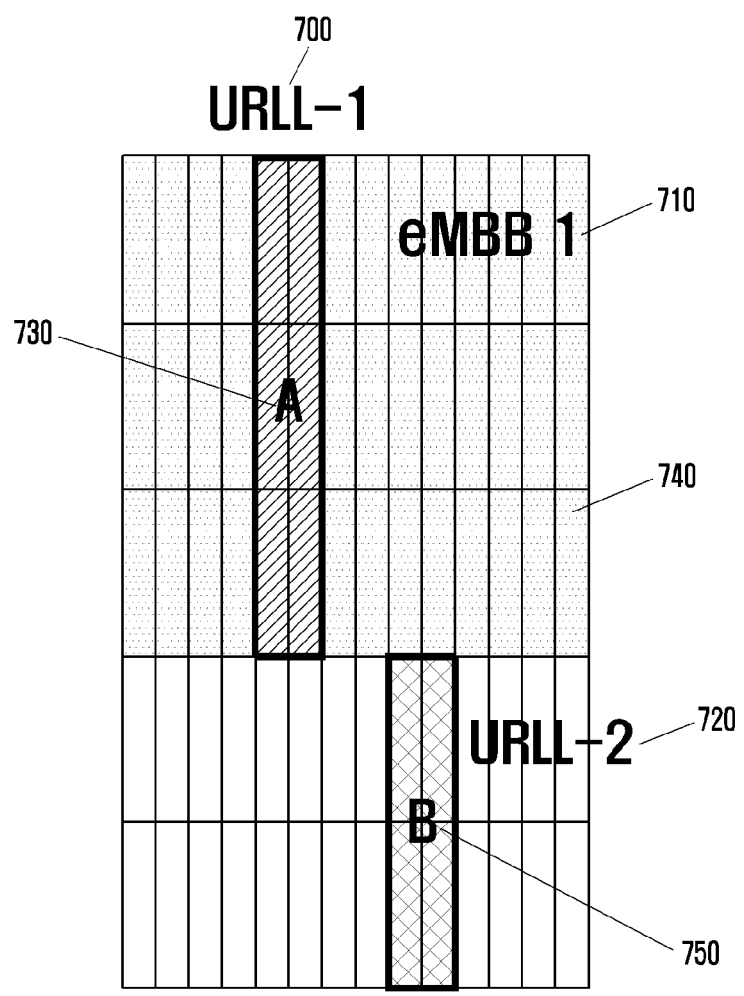
FIG. 7 illustrates another embodiment of the disclosure.

FIG. 7 illustrates another embodiment of the disclosure. Referring to FIG. 7, eMBB terminal 1 710 receives a signal in a region 740, and URLLC terminal 1 700 receives a signal in region A 730, in which partial puncturing is applied in a resource-overlapping region (that is, region A) of the region 740 and region A. Here, a transmitter transmitting an eMBB signal and a transmitter transmitting URLLC signal 1 transmit signals according to the method described above. URLLC terminal 2 720 receives a signal in region B 750. Since there is no eMBB signal functioning as interference in region B, a transmitter transmitting URLLC signal 2 does not need to apply a phase shift to transmit a signal.

Figure 8:
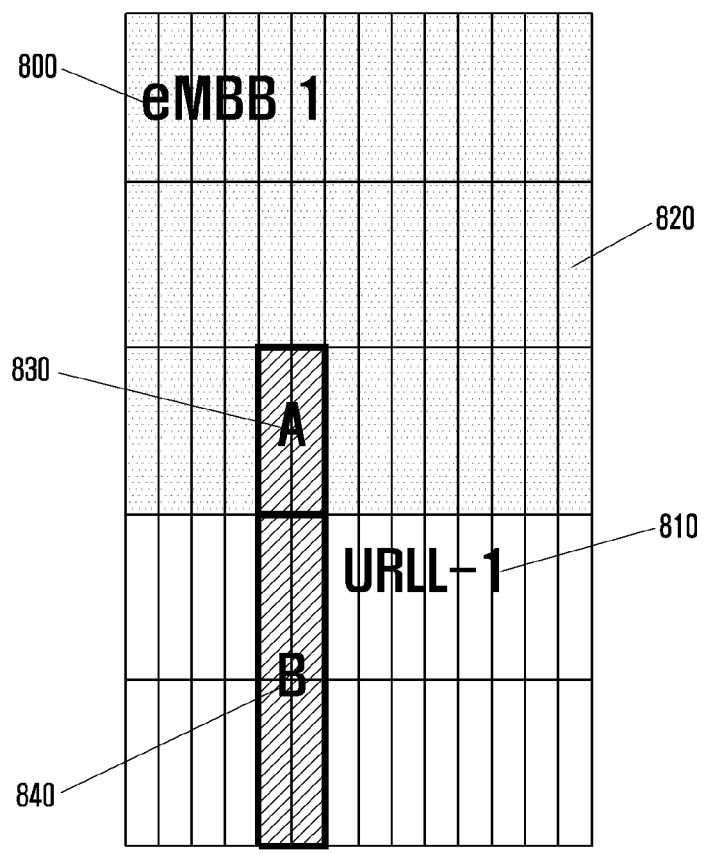
FIG. 8 illustrates still another embodiment of the disclosure.

FIG. 8 illustrates still another embodiment of the disclosure. Referring to FIG. 8, full puncturing is applied to a resource region 820 for eMBB terminal 1 800 in region A 830 for URLLC terminal 1 810, and there is no overlapping eMBB signal in region B 840 for URLLC terminal 1.

Figure 9:
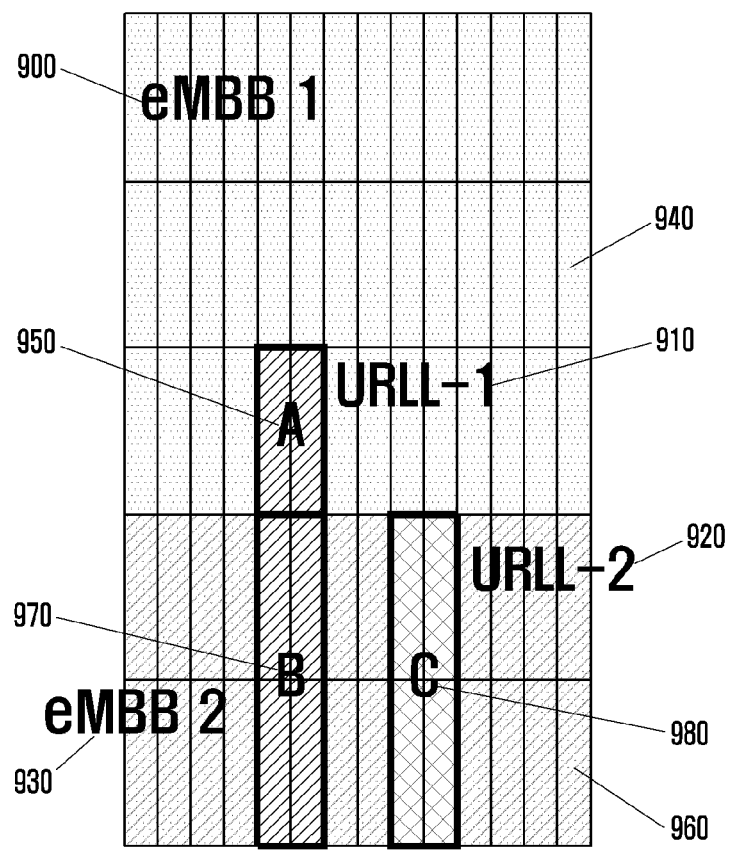
FIG. 9 illustrates yet another embodiment of the disclosure.

FIG. 9 illustrates yet another embodiment of the disclosure. Referring to FIG. 9, region A 950 for URLLC terminal 1 910 overlaps with a region 940 for eMBB terminal 1 900, in which case full puncturing is performed. In region B 970 where the resource region for URLLC terminal 1 overlaps with a resource region 960 for eMBB terminal 2, partial puncturing is applied to the resource region for eMBB terminal 2. Further, a resource region (region C 980) for URLLC terminal 2 920 overlaps with the resource region for eMBB terminal 2, in which case partial puncturing may be performed in the overlapping region C.

Figure 10:
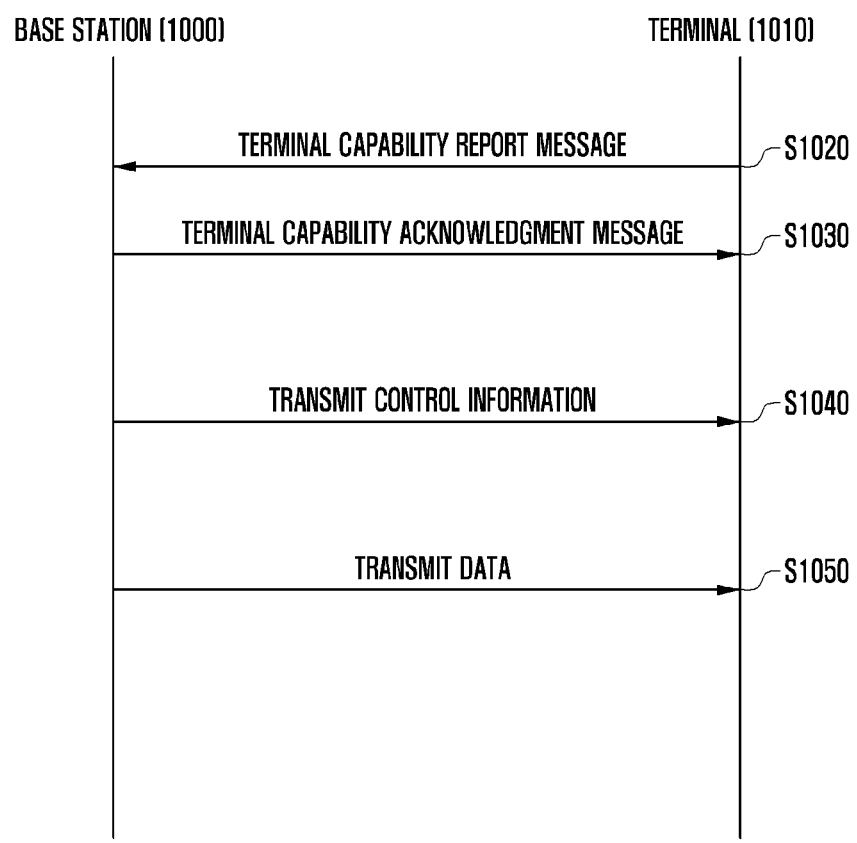
FIG. 10 illustrates a method in which a base station and a terminal perform the disclosure.

FIG. 10 illustrates a method in which a base station and a terminal perform the disclosure. Referring to FIG. 10, the base station 1000 may be a transmitter, the terminal 1010 may be a receiver, the transmitter may transmit an eMBB signal or a URLLC signal, and the terminal may receive an eMBB signal or a URLLC signal.

The terminal may transmit a terminal capability report message including information indicating that the terminal is capable of receiving signals of heterogeneous services to the base station according to the disclosure (S1020). The terminal capability report message may include information on a service that the terminal is capable of receiving, and may be omitted if the base station already knows such information. The base station transmits an acknowledgment message of the terminal capability report message (S1030), which may be omitted.

The base station transmits control information on the reception of heterogeneous services to the terminal (S1040). This control signal may include information indicating some of the predetermined phase shift values and/or information indicating a phase shift value and/or information indicating some of the predetermined power weighting factors according to a communication system, and/or information indicating a power weighting factor and/or information on a puncturing pattern, and/or information on a resource region for transmitting a URLLC signal. If the receiver acquires all the information through blind detection, this control information may be omitted. In addition, the resource region for transmitting the URLLC signal may be indicated by grouping and indexing a plurality of resource blocks or a small unit of resources or may be indicated using the index of a specific resource block. Further, a puncturing pattern applied to partial puncturing may be omitted if predetermined between the base station and the terminal.

The base station transmits data according to each service to the terminal (S1050), and the terminal may obtain necessary information by blindly detecting a signal transmitted from the base station based on the control information and may perform channel decoding.

The above method is described based on downlink signal transmission by the base station. However, the content of the disclosure is not necessarily applied to downlink signal transmission but may be applied to uplink transmission by the terminal.

Figure 11:
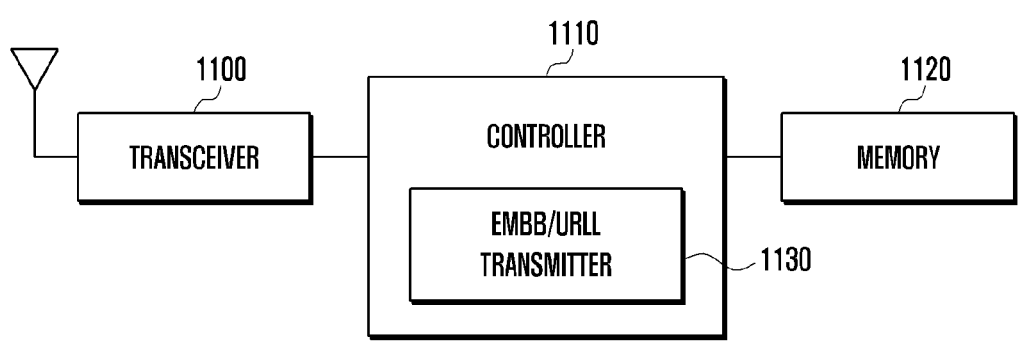
FIG. 11 is a block diagram illustrating the configuration of a base station.

FIG. 11 is a block diagram illustrating the configuration of a base station. Referring to FIG. 11, the base station may include a transceiver 1100, a controller 1110, and a memory 1120. Here, the transceiver may transmit an eMBB signal or a URLLC signal, and may transmit a signal by applying a phase shift value and/or performing power control according to the content of the disclosure. An eMBB/URLLC transmitter 1130 included in the controller controls the transceiver to transmit an eMBB signal or a URLLC signal by applying a specific phase shift value and/or a power weighting factor according to the content of the disclosure. This function may be performed by the controller. In addition, the controller may control the transceiver to transmit control information on transmission and reception of heterogeneous services to the terminal.

Figure 12A:
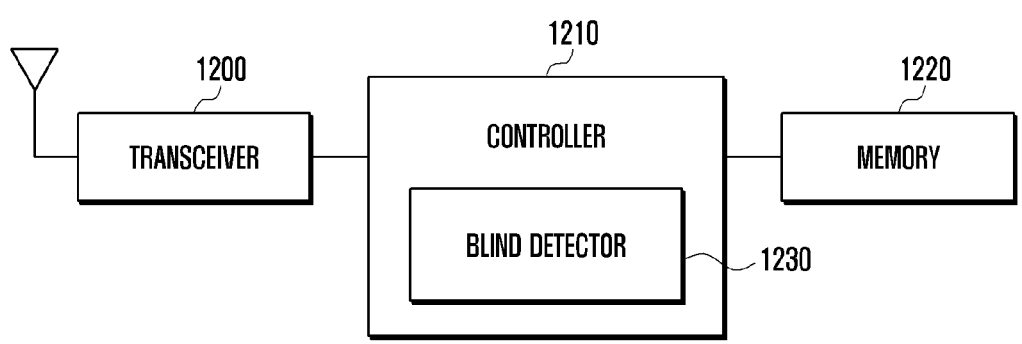
FIG. 12A is a block diagram illustrating the configuration of an eMBB service-receiving terminal.

FIG. 12A is a block diagram illustrating the configuration of an eMBB service-receiving terminal. Referring to FIG. 12A, the eMBB terminal may include a transceiver 1200, a controller 1210, and a memory 1220. The transceiver may receive an eMBB signal, and the eMBB signal may be a signal fully punctured or partially punctured according to the content of the disclosure. Further, the eMBB signal may be a signal to which a power weighting factor is applied. A blind detector 1230 included in the controller estimates a region where the eMBB signal collides with a URLLC signal based on a signal received by the transceiver and a puncturing pattern, estimates a modulation method for the URLLC signal, and obtains a power weighting factor to be applied to a reception symbol in the overlapping region. Subsequently, the URLLC signal acting as interference may be eliminated using an interference cancellation reception technique based on the obtained information on the URLLC signal. Here, the puncturing pattern may be predefined or may be estimated by the blind detector, and the function of the blind detector may be performed by the controller. In addition, the controller may receive control information on transmission and reception of heterogeneous services and may store the control information in the memory.

Figure 12B:
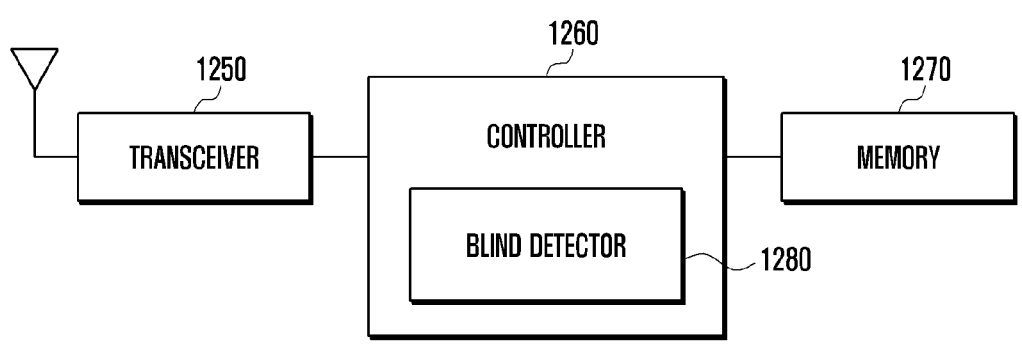
FIG. 12B is a block diagram illustrating configuration of a URLLC service-receiving terminal.

FIG. 12B is a block diagram illustrating configuration of a URLLC service-receiving terminal. Referring to FIG. 12B, the URLLC terminal may include a transceiver 1250, a controller 1260, and a memory 1270. The transceiver may receive a URLLC signal, and the URLLC signal may be a signal to which a specific phase shift value and/or a power weighting factor is applied. A blind detector 1280 included in the controller estimates a region where the URLLC signal collides with an eMBB signal based on a signal received by the transceiver and a puncturing pattern, estimates a modulation method for the eMBB signal, and obtains a power weighting factor to be applied to a reception symbol in the overlapping region. Subsequently, the eMBB signal acting as interference may be eliminated using an interference cancellation reception technique based on the obtained information on the eMBB signal. Here, the puncturing pattern may be predefined or may be estimated by the blind detector, and the function of the blind detector may be performed by the controller. In addition, the controller may receive control information on transmission and reception of heterogeneous services and may store the control information in the memory.

The invention claimed is:

1. A signal transmission method for transmitting a signal by a transmitter, the method comprising:
    identifying a first signal and a second signal; and
    transmitting the first signal to a receiver by applying puncturing to a resource where a resource for transmitting the first signal overlaps with a resource for transmitting the second signal and transmitting the second signal by applying a phase shift value to the second signal, wherein, in case that a same modulation order is applied to the first signal and the second signal, the phase shift value applied to the second signal is one of a first phase shift value or a second phase shift value, wherein whether the first phase shift value or the second phase shift value is applied to the second signal is determined based on whether a full puncturing is applied or a partial puncturing is applied to the first signal, and
    wherein the phase shift value corresponding to the full puncturing for the first signal is different from the phase shift value corresponding to the partial puncturing for the first signal.

2. The signal transmission method of claim 1, wherein the first signal is transmitted by applying a power weighting factor to the first signal transmitted on overlapping resources in case that the partial puncturing is applied.

3. The signal transmission method of claim 2, further comprising:
    transmitting a control signal comprising information on transmission of the first signal and the second signal,
    wherein the information comprises information on the overlapping resources.

4. A signal reception method by a receiver, the method comprising:
    receiving a second signal;
    estimating a phase shift value applied to the second signal on a resource;
    identifying that a first signal is punctured in the resource based on the phase shift value;
    decoding the second signal based on the first signal; and
    determining whether puncturing applied to the first signal is full puncturing or partial puncturing based on the phase shift value,
    wherein, in case that a same modulation order is applied to the first signal and the second signal, the phase shift value applied to the second signal is one of a first phase shift value or a second phase shift value, wherein whether the first phase shift value or the second phase shift value is applied to the second signal is determined based on whether a full puncturing is applied or a partial puncturing is applied to the first signal, and
    wherein the phase shift value corresponding to the full puncturing for the first signal is different from the phase shift value corresponding to the partial puncturing for the first signal.

5. The signal reception method of claim 4, wherein the decoding is performed assuming that the first signal is received on the resource in case that the full puncturing is applied to the first signal.

6. The signal reception method of claim 4, wherein, in case that the partial puncturing is applied to the first signal, the decoding further comprises:
    identifying a resource for receiving the first signal in a punctured resource according to a predetermined puncturing pattern; and
    performing the decoding in view of the resource for receiving the first signal.

7. A transmitter for transmitting a signal, the transmitter comprising:
    a transceiver; and
    a controller configured to:
    identify a first signal and a second signal, and
    transmit the first signal to a receiver by applying puncturing to a resource where a resource for transmitting the first signal overlaps with a resource for transmitting the second signal and transmit the second signal by applying a phase shift value to the second signal,
    wherein, in case that a same modulation order is applied to the first signal and the second signal, the phase shift value applied to the second signal is one of a first phase shift value or a second phase shift value, wherein whether the first phase shift value or the second phase shift value is applied to the second signal is determined based on whether a full puncturing is applied or a partial puncturing is applied to the first signal, and
    wherein the phase shift value corresponding to the full puncturing for the first signal is different from the phase shift value corresponding to the partial puncturing for the first signal.

8. The transmitter of claim 7, wherein the first signal is transmitted by applying a power weighting factor to the first signal transmitted on overlapping resources in case that the partial puncturing is applied.

9. The transmitter of claim 8, wherein the controller is further configured to control to transmit a control signal comprising information on transmission of the first signal and the second signal,
    wherein the information comprises information on the overlapping resources.

10. A receiver for receiving a signal, the receiver comprising:
    a transceiver; and
    a controller configured to:
    receive a second signal,
    estimate a phase shift value applied to the second signal on a resource, identify that a first signal is punctured in the resource based on the phase shift value, decode the second signal based on the first signal, and determine whether puncturing applied to the first signal is full puncturing or partial puncturing based on the estimated phase shift value, wherein, in case that a same modulation order is applied to the first signal and the second signal, the phase shift value applied to the second signal is one of a first phase shift value or a second phase shift value, wherein whether the first phase shift value or the second phase shift value is applied to the second signal is determined based on whether a full puncturing is applied or a partial puncturing is applied to the first signal, and wherein the phase shift value corresponding to the full puncturing for the first signal is different from the phase shift value corresponding to the partial puncturing for the first signal.

11. The receiver of claim 10, wherein the controller is further configured to control to decode the first signal received on the resource in case that the full puncturing is applied to the first signal.

12. The receiver of claim 10, wherein the controller is further configured, in case that the partial puncturing is applied to the first signal, to control to:

identify a resource for receiving the first signal in a punctured resource according to a predetermined puncturing pattern, and decode the resource for receiving the first signal.

* * * * *